Nov. 2, 1971  A. J. CIRGENSKI ET AL  3,616,585
CURVED STAIRCASE FRAME AND METHOD OF MAKING
Filed June 4, 1968  2 Sheets-Sheet 1
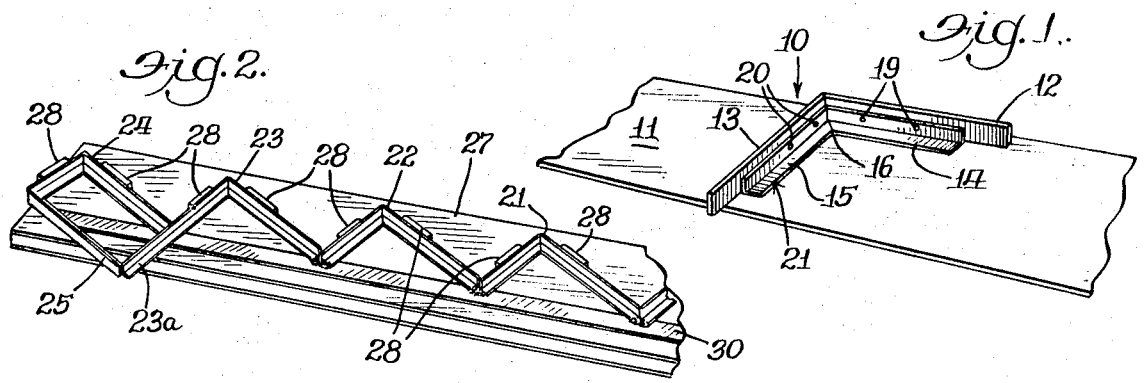
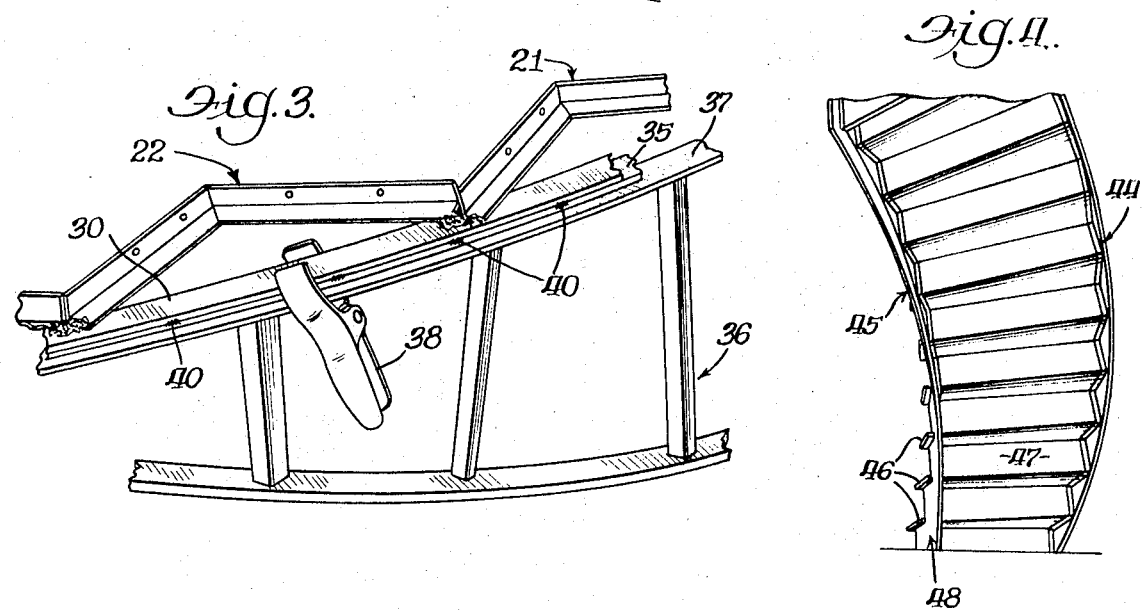
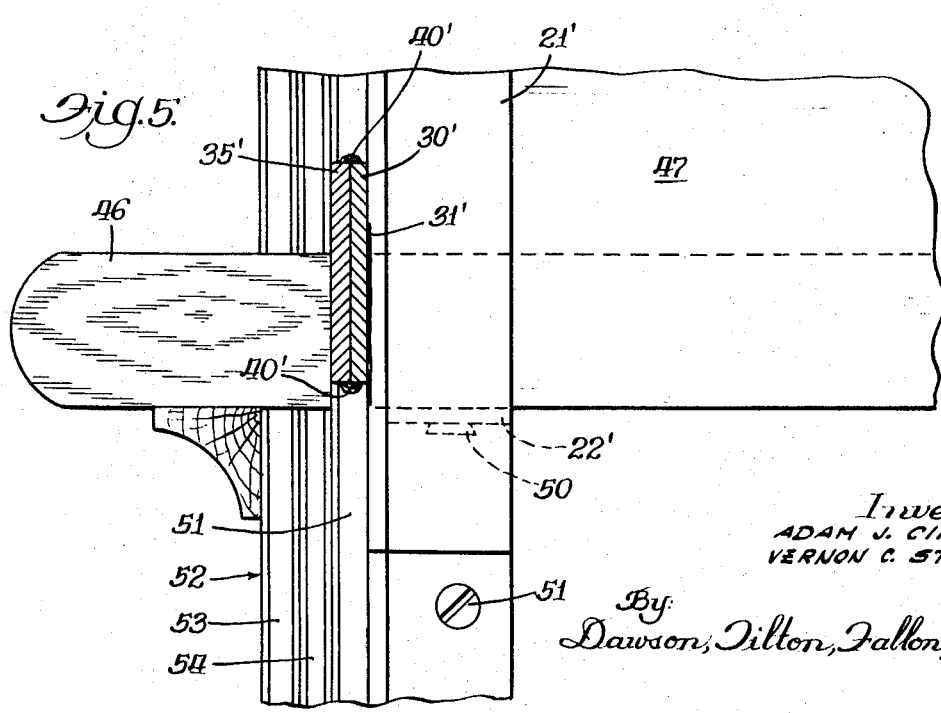
Inventors:
ADAM J. CIRGENSKI
VERNON C. STILES
By:
Dawson, Tilton, Fallon & Lungmus
Attys.

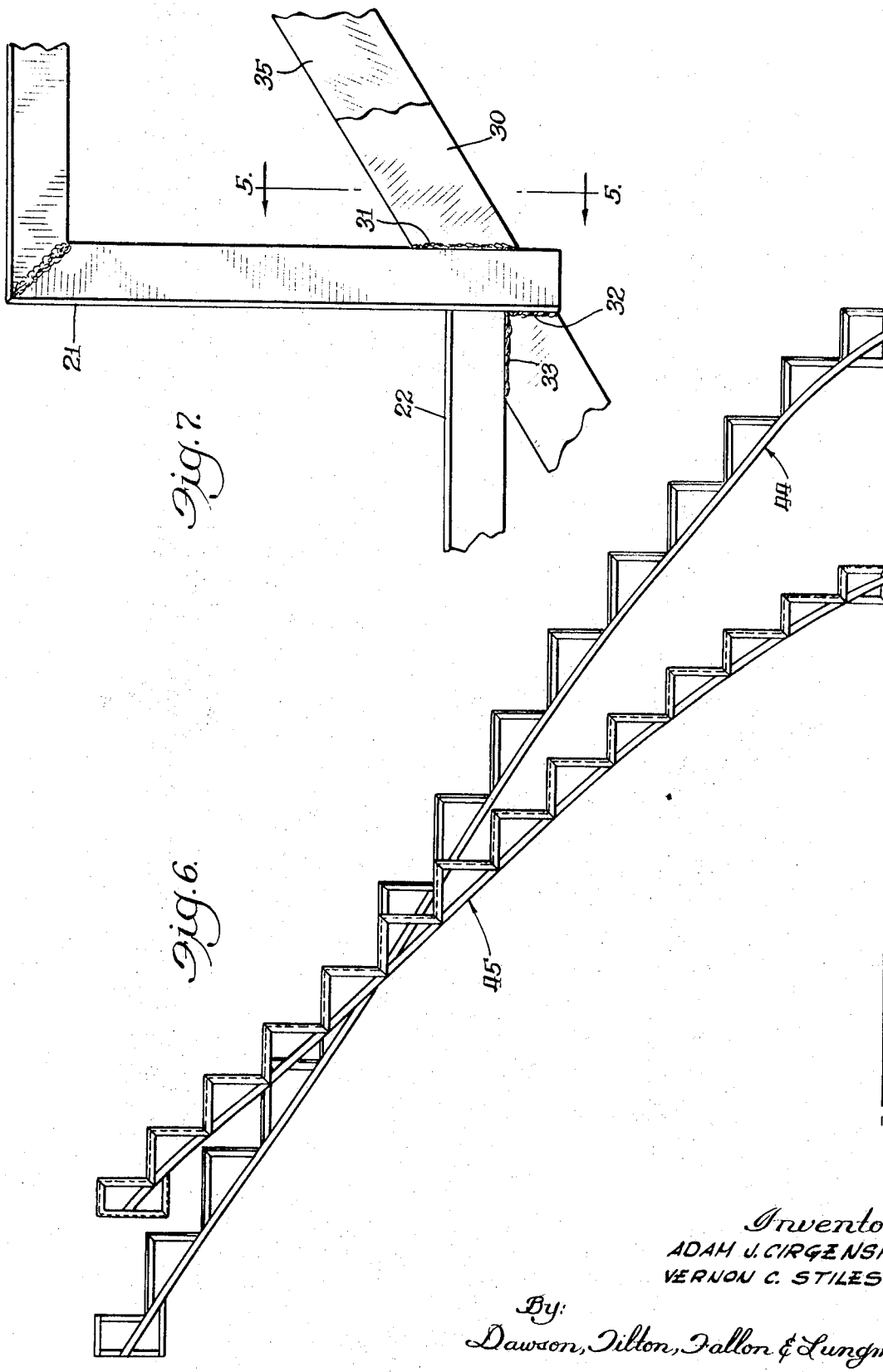

United States Patent Office 3,616,585
Patented Nov. 2, 1971

3,616,585
CURVED STAIRCASE FRAME AND METHOD
OF MAKING
Adam J. Cirgenski, Lambertville, Mich., and Vernon C. Stiles, Toledo, Ohio, assignors to Stile-King Stairs, Inc., and Scholz Homes, Inc., Toledo, Ohio, fractional part interest to each
Filed June 4, 1968, Ser. No. 734,413
Int. Cl. E04f *11/10, 11/12*
U.S. Cl. 52—187
3 Claims

ABSTRACT OF THE DISCLOSURE

Right-angle braces are formed of two sections of angle iron mitered together. One leg of the brace is adapted to receive the riser of a stair; and the other leg is adapted to receive the tread of the stair. A number of these braces, each designed to define one side of a step in a curved staircase, are mounted on a flat metal bar to form a flat string for the staircase. A similar flat metal bar is placed in a jig at the pitch and curvature the finished staircase is intended to assume; and the formed string is placed in the jig with the two flat bars engaging each other throughout their lengths. The two bars are then welded together to form a lamination while in the jig to provide the curved horse for one side of the staircase with the laminated bars retaining the desired curve and pitch after removal from the jig. Another metal horse is similarly formed for the other side of the staircase, but in a separate jig of different curvature. After the two curved horses are installed, the treads and risers are attached to a pair of associated braces by screws inserted from beneath the metal frames.

BACKGROUND

The present invention relates to curved residential staircases; more particularly, it relates to a pre-fabricated supporting frame for a circular staircase and a method for making it.

The prevailing commercial method for making prefabricated curved staircases to be installed in a residence includes forming a laminated wood framework which is notched at right angles to provide vertical and horizontal supports to which are attached the risers and treads of the staircase after the wood laminated frames are installed on either side of the staircase.

The process for fabricating these wood horses is time-consuming, ordinarily taking of the order of two days for completion of the lamination process. Further, once completed, these wooden horses are bulky and relatively heavy thereby making them hard to handle by a contractor during installation. This weight factor is also a disadvantage during the fabrication process in which the framework must be maneuvered. A further disadvantage of wooden horses is that when they are stored for long periods of time, they tend to loose their curvature; and if this loss of curvature becomes excessive, the framework becomes useless for its intended purpose. With this in mind, a manufacturer will not stockpile these wood frames, but he will wait for an order and thus cause a delay in delivery.

SUMMARY

The present invention contemplates prefabricating a metal framework or horse to receive the tread and risers of a curved, residential staircase. The metal horse is fabricated by forming right-angle braces of two sections of angle irons mitered and welded together. The braces (one for each step) are then welded to a first flat metal bar in adjacent relation to each other. When all of the braces are thus secured to this flat metal bar, the resultant frame takes the form of a conventional framework or stringer for a wooden staircase. A second flat metal bar, similar to the one on which the braces are welded, is placed in a parabolically-curved jig or fixture with the proper curvature and pitch as desired in the finished curved staircase. The formed metal stringer is then placed in the jig alongside the second or outer metal bar; and the two flat metal bars are welded together at spaced intervals on top and bottom.

When the combination is removed from the jig, it retains the same curvature and pitch as is defined by the jig so that the result is a permanently-curved metal framework for supporting one side of a staircase. A second framework is similarly formed; and when the two metal horses are installed, conventional treads and risers are secured to them by means of screws extending through apertures on the braces to provide a permanent and secure mounting.

The resultant metal horse has been found to be lighter than its wooden counterpart by about 80 pounds which facilitates handling during fabrication and installation. The metal horses have been found to have the advantage that the fabrication time has been reduced from about 2 days to one to two hours. Further, despite long periods of storage under varying conditions of temperature and humidity, the metal horses retain their original shape thus facilitating the fabrication and storage of a number of such horses to provide a backlog without fearing their deterioration.

Other features and advantages of the present invention will be obvious to persons skilled in the art from the following detailed description of a preferred embodiment accompanied by the attached drawing wherein identical reference numerals will refer to like parts in the various views.

The drawing:

FIG. 1 shows the fabrication of a brace;

FIG. 2 illustrates the braces welded to a flat metal bar;

FIG. 3 illustrates two flat metal bars clamped together in a curved jig;

FIG. 4 is a perspective view of a staircase incorporating metal horses according to the present invention taken from beneath the staircase;

FIG. 5 is a detailed section view of one tread of FIG. 4;

FIG. 6 is a side elevation of the metal horses as installed in a staircase; and

FIG. 7 is a closeup view of a portion of a finished metal horse according to the present invention.

DETAILED DESCRIPTION

Referring to FIG. 1, there is shown a right-angle fixture generally designated 10 and including a flat baseboard 11 on which are securely mounted first and second rails 12 and 13. The rails 12 and 13 define a right-angle for receiving first and second sections of angle irons designated respectively 14 and 15.

The sections 14 and 15 are mitered to form a common edge between them as at 16. The sections 14 and 15 are then welded together along the mitered interface 16 to form a right-angle brace generally designated 21. The right-angle brace 21 forms a sub-frame for receiving and supporting one side of a tread (as on the angle 14) and one side of a riser on the section 15. The particular element 21 illustrated would ultimately be placed on the right-hand side of a curved staircase as viewed from the top. Each of the sections 14 and 15 are provided with apertures, as at 19 and 20 respectively, for receiving screws which are then fastened into the tread and riser of the stair.

It will be appreciated that the width of the treads of a curved staircase vary and that even for a given tread, the width will be less on that side of the tread having the smaller radius of curvature. Thus, each of the tread portions of the braces used is pre-cut according to a known design for any given staircase; and the present invention is not limited to particular dimensional details.

Turning now to FIG. 2, a number of braces formed according to the procedure described above are designated respectively 21, 22, 23 and 24. These will ultimately form supports for the lower four steps of the staircase; and as seen in the drawing, the riser portion of the brace 23 is elongated as at 23a; and a separate angle iron 25 interconnects the portion 23a of the riser 23 and the riser portion of the brace 24 of the lowest step. Thus, the framework for the lowermost step is formed into a rectangular brace including a support iron which may be screwed to the floor.

Each of the braces 21–24 is placed on a flat jig board designated 27 and including a plurality of guide blocks 28 for positioning the braces. An elongated, flat metal bar 30 is placed on the flat jig 27; and it runs along the adjacent edges of the braces 21–24. Each of the braces 21–24 is then welded to the flat bar 30 at the end of its riser portion and at the end of its tread portion. This is illustrated more clearly in FIG. 7 (although FIG. 7 shows the completed curved framework) by means of the welds at 31 and 32 securing riser portion of brace 21 to the bar 30 and the weld at 33 securing the tread portion of the brace 22 to the bar 30 and in abutment with the brace 21.

When all of the braces have thus been welded to the flat bar 30 as are necessary for completing the entire right-hand portion of the supporting framework for the staircase (assuming the staircase is to curve to the left as viewed from the top), the result resembles a flat wooden horse or stringer for a conventional straight staircase.

Turning now to FIG. 3, a second elongated, flat metal bar 35 is placed in a jig generally designated 36 and providing a curved guide surface 37 along which the bar 35 is placed. The guide surface 37 defines the parabolic curve of the finished metal horse. The jig need not be secured in place.

Next, the flat metal horse fabricated as described above is placed in the jig with the flat bar 30 lying adjacent the flat bar 35. When fabrication is completed, the bar 30 becomes an inner bar and the bar 35 becomes an outer bar. The outer bar 35 and the flat metal horse including the inner metal bar 30 are clamped in the jig 36 by means of clamps as at 38; and the inner bar and outer bar 35 are welded together at spaced intervals, designated by reference numeral 40 in FIG. 3 on both sides (i.e. top and bottom) of the two abutting contacting bars.

After the inner and outer bars have been thus welded together the clamps may be removed; and the finished metal horse may then be removed from the jig 36. It will retain the desired shape as defined by the jig. The metal horse thus formed may be stored for indefinite periods of time without loosing its shape; and it is lighter than its wooden counterpart by about eighty pounds.

Turning now to FIG. 4, the completed right-side metal horse is generally designated by reference numeral 44. A left-side metal horse is fabricated similarly to the method described above; but this horse ordinarily has a different curvature according to the design of the staircase. The left-side horse is generally designated 45 in the drawing. It will be appreciated that the jig into which it is fit will be convex rather than concave since the straight stringer with the braces and the flat outer bar are reversed in relation to each other, and the flat bar is placed in the jig first. Preferably, the entire staircase is fabricated before shipment to the location which it will be installed; however the treads 46 and risers 47 may be secured to the tread and riser sections of the braces on location, if desired. Holes are drilled in the laminated metal bars of the horses for receiving wooden skirt boards 48 to cover the metal framework.

FIG. 5 is a detailed drawing of the construction taken through a vertical line extending through the left-side metal framework 45 of FIG. 4; and the elements of the framework shown in FIG. 5 may be correlated with those of FIG. 7 which is, of course, a view of the right-side metal framework. The corresponding reference numerals used in FIG. 5 are the same for those used in FIG. 7 together with a prime designation indicating a counterpart. Thus, an inner flat bar is designated 30′ and an outer flat bar is designated 35′. The riser portion of the upper brace is designated 21′. The tread portion of a lower brace is designated 22′; and a wood screw 50 extends through the tread portion of the lower brace 22′ and is received in the oak tread 46. A similar wood screw 51 extends through the riser portion of the brace 22′ for securing the white pine riser of the next lower stair. As can be seen in the drawing, the riser section of the brace 21′ is welded to the laminated bars 30′ and 35′ at 31′; and the laminated bars are welded together at both top and bottom (reference numeral 40′).

A triangular-shaped filler piece, designated by reference numeral 51 in FIG. 5, having a width equal to the width of laminated bars 30′ and 35′ is used to fill the triangular space defined by a riser and tread of one stair and the laminated strip. A laminated wooden skirt board generally designated 52, including a first section 53 and a second section 54, is attached to the metal horse and corresponds to the skirt board 48 of FIG. 4. The attachment, as described above, is by means of screws fitting through apertures in the laminated metal bar of the horse and being received in the skirt board 52.

The metal framework for the staircase of FIG. 4 as seen from the side, is shown in FIG. 6 wherein, again, the metal horse having the largest radius of curvature is generally designated 44, and the metal horse having the smaller radius of curvature is generally designated 45. As will be appreciated, during the fabrication of the metal horse 45, the first flat metal bar is curved in a concave jig so that the inner metal bar containing the braces may be placed on it and welded to it; whereas in the fabrication of the metal horse 44, the first metal bar is placed in a convex jig before the inner metal bar having the braces is welded to it.

Having thus described in detail a preferred embodiment of the inventive method and structure, it will be apparent to persons skilled in the art that certain modifications may be made and that equivalent structure may be substituted for that which has been described; and it is, therefore, intended that all such modifications and equivalents be covered as they are embraced within the spirit and scope of the appended claims.

We claim:

1. A curved residential staircase comprising first and second metal frame works located at either side of said staircase to provide a pair of supports for receiving each riser and tread of said staircase, each of said frame works comprsing first and second elongated metal bars secured together in laminated relation substantially throughout their length in a predetermined curved relation defined by the curvature and pitch of said staircase and a plurality of braces mounted along said laminated bars for receiving said risers and treads; a riser and a tread secured to each pair of braces; triangular wood filler sections placed in a triangle defined by the laminated portion of the bar and a riser and a tread for said frame work; and a notched skirt-board secured to the outside of said frame work for covering the same, said skirtboard being secured to said laminated bars.

2. A frame for a circular staircase of predetermined pitch and curvature comprising: first and second elongated metal bars placed side by side substantially throughout their length in a predetermined curved relation defined by the pitch and curvature of the staircase; means for securing said first and second bars together substantially throughout their entire lengths and for permanently retaining said bars in said predetermined curvature; and a plurality of braces mounted in spaced relation along said laminated bars for receiving the risers and treads of said staircase.

3. The structure of claim 2 wherein each of said braces comprises a first angle iron for receiving the tread portion of a stair, and a second angle iron section mitered with and attached to said first angle iron section and depending therefrom at a right angle for receiving the riser portion of a stair.

References Cited

UNITED STATES PATENTS

| | | | |
|---|---|---|---|
| 853,134 | 5/1907 | Steiber | 52—182 |
| 2,000,599 | 5/1935 | Leake | 287—189.36 B |
| 2,784,983 | 3/1957 | Dean | 287—189.36 B |

FOREIGN PATENTS

| | | | |
|---|---|---|---|
| 1,370,733 | 1964 | France | 52—188 |

JOHN E. MURTAGH, Primary Examiner